United States Patent [19]

Hiramatsu et al.

[11] Patent Number: 4,995,491
[45] Date of Patent: Feb. 26, 1991

[54] POWER TRANSMISSION APPARATUS

[75] Inventors: Takeo Hiramatsu, Nagaokakyo; Kenjiro Fujita, Kusatsu; Yoshimasa Nagayoshi, Kyoto; Yoshiaki Hamasaki; Satoshi Kawai, both of Minamiku, all of Japan

[73] Assignees: Mitsubishi Jidosha Kogyo Kabushiki Kaisha; Koyo Seiko Kabushiki Kaisha, both of Japan

[21] Appl. No.: 280,409

[22] Filed: Dec. 6, 1988

[30] Foreign Application Priority Data

Dec. 8, 1987 [JP] Japan .................. 62-310472
Jun. 7, 1988 [JP] Japan .................. 63-140117

[51] Int. Cl.⁵ .......................................... F16D 31/00
[52] U.S. Cl. .................... 192/58 R; 192/60; 180/248
[58] Field of Search .......... 192/58 R, 61, 60, 0.003; 180/248; 74/711

[56]  References Cited

U.S. PATENT DOCUMENTS

| 3,133,617 | 5/1964 | Hartmann | 192/58 R |
| 4,676,336 | 6/1987 | Hiramatsu et al. | 180/233 |
| 4,719,998 | 1/1988 | Hiramatsu et al. | 192/0.033 |
| 4,730,514 | 3/1988 | Shikata et al. | 74/711 |
| 4,829,769 | 5/1989 | Hiramatsu | 192/60 |

FOREIGN PATENT DOCUMENTS

| 0235102 | 1/1987 | European Pat. Off. |
| 3621197 | 1/1987 | Fed. Rep. of Germany |
| 256135 | 3/1926 | United Kingdom |
| 449006 | 10/1934 | United Kingdom |
| 459914 | 4/1936 | United Kingdom |
| 808311 | 6/1955 | United Kingdom |
| 1221671 | 2/1967 | United Kingdom |
| 2154522 | 9/1985 | United Kingdom |
| 2189861 | 11/1987 | United Kingdom |

Primary Examiner—Richard Lorence
Assistant Examiner—Andrea Pitts
Attorney, Agent, or Firm—Wegner, Cantor, Mueller & Player

[57]  ABSTRACT

A power transmission apparatus suitable for use with a four wheel drive apparatus of an automobile which can prevent production of rattling noises of a driving system and occurrence of a swerving phenomenon of the automobile. The apparatus includes a cam ring connected to a first rotary shaft and a rotor connected to a second rotary shaft and accommodated for rotation in the cam ring to define a pump chamber therebetween and is designed to transmit driving force between the first and second rotary shafts in accordance with a pressure of working fluid in the pump chamber which is produced in response to rotation of the first and second rotary shafts relative to each other. The apparatus comprises a frictional force applying mechanism interposed between the first and second rotary shafts for applying predetermined frictional force between them to assure stabilized transmission of torque between the first and second rotary shaft.

10 Claims, 9 Drawing Sheets

POWER TRANSMISSION APPARATUS

BACKGROUND OF THE INVENTION

1. Field of the Invention

This invention relates to a power transmission apparatus of the hydraulic pump type for transmitting torque in accordance with a hydraulic pressure which is produced in response to a difference in rotational speed between two rotary shafts, and more particularly to a power transmission apparatus of the type mentioned which is suitable for use with a four wheel drive apparatus of an automobile.

2. Description of the Prior Art

In a four wheel drive apparatus, for example, wherein front and rear wheels are driven commonly by a single engine, the front and rear wheels sometimes rotate at different rotational speeds because they have somewhat different effective rotational radii or because rolling routes are different not only between the left and right wheels but also between the front and rear wheels when the automobile makes a turn or the like. Such a difference in rotational speed between the front and rear wheels will cause an undesirable tight corner braking phenomenon.

Automobiles of the so-called full time four wheel drive type have been developer, therefore, which include a power transmission apparatus interposed between front and rear wheels for preventing occurrence of a tight corner braking phenomenon and for distributing driving force of an engine to the front and rear wheels in response to a difference in rotational speed between the front and rear wheels.

Such a power transmission apparatus either includes a differential gear (center differential gear) interposed between front and rear wheels for absorbing a difference in rotational speed between the front and rear wheels and a differential locking mechanism for locking operation of the front or rear wheels (or a viscous coupling for limiting operation of the front or rear wheels), or singly includes a viscous coupling.

A power transmission apparatuur of the type which includes a center differential gear is complicated in structure because such a center differential gear cannot readily be reduced in size and will cause an increase in weight of a car body and also in production cost and besides a differential locking mechanism, a viscous coupling or a like mechanism for assuring the four wheel drivability is required.

To the contrary, a power transmission apparatus of the type which singly includes a viscous coupling has such a torque transmission characteristic that the torque transmission gradually decreases as the difference in rotational speed between front and rear wheels increases. Accordingly, when the automobile travels on a road having a very low coefficient of friction such as, for example, a sandy road, a muddy place or a snowy or slushy road, if the difference in rotational speed between the front and rear wheels is not sufficiently great, torque cannot be transmitted to the driven side wheels, and consequently, there is the possibility that a slip may occur at the driving side wheels.

A novel power transmission apparatus has been thus proposed and is disclosed, for example, in British Pat. No. 21 54 522 and U.S. Pat. No. 4,676,336 wherein torque is suitably transmitted from the front wheel side to the rear wheel side by means of a hydraulic pressure mechanism in place of such a center differential gear and a viscous coupling as described above.

The power transmission apparatus includes a hydraulic pump interposed, for example, in a driving system which interconnectes front and rear wheels. The hydraulic pump includes a rotor connected to be rotated in response to one of front and rear wheels, and a casing connected to be rotated in response to the other of the front and rear wheels. The rotor is accommodated in a coaxial relationship in the casing such that the former may rotate relative to the latter at a rotational speed corresponding to a difference in rotational speed which occurs between the front and rear wheels. The hydraulic pump thus accomplished transmission of driving force between the rotor and the casing thereof, that is, between the front and rear wheels of the automobile in accordance with such a characteristic as illustrated by a solid line curve in FIG. 4 by way of a hydraulic pressure which is produced in the hydraulic pump in response to relative rotation between the rotor and the casing. The power transmission apparatus has excellent features, comparing with a power transmission apparatus which employs a viscous coupling, that great driving force can be transmitted with a compact construction and that occurrence of the tight corner braking phenomenon can be restricted significantly.

Figure 4:
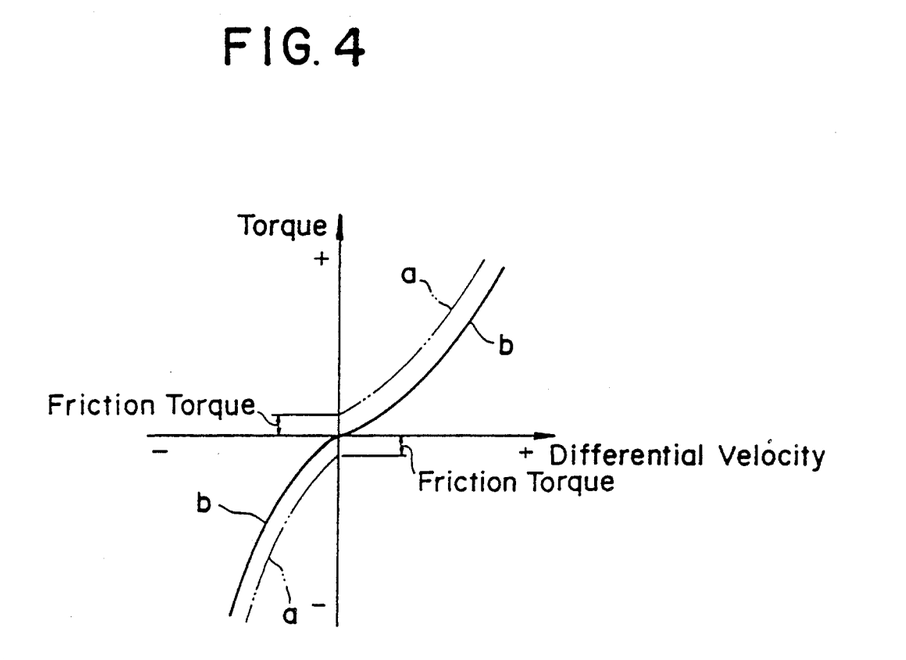
FIG. 4 is a graph illustrating a relationship between a difference in rotational speed between front and rear wheels of the automobile and a transmission torque in comparison with that of a conventional power transmission apparatus.

With the conventional power transmission apparatus described above, however, the difference in rotational speed between front and rear wheel is small when the automobile is running, for example, at a constant speed on a straight road, but within such a region wherein the difference in rotational speed between the front and rear wheels is small, the torque transmission is very low as seen from FIG. 4.

Consequently, as the rotational speed of a driving system for the front wheels varies, gear wheels and like motion transmitting elements of another driving system for the rear wheels often collide with each other to produce rattling noises which sound disagreeably inside and outside of the automobile. Since the greater the torque (total torque of the driving systems for the front and rear wheels), the greater the variation in rotational speed of the front wheel driving system, if the output power of an automobile increases, the automobile will suffer more seriously from such a problem of noises as described above.

Further, when the automobile runs on a road on which sandy places, muddy places and/or snowy or slushy places which all have a low coefficient of friction are locally present, the front wheels will alternately and repetitively brought into a slipping condition and a non-slipping condition, and accordingly a condition wherein the difference in rotational speed between the front and rear wheels is large and another condition wherein the difference is small or almost zero will occur alternately and repetitively. Consequently, a condition wherein a torque is transmitted to the rear wheels and another condition wherein little torque is transmitted to the rear wheels are repeated successively, and as a result, there is the possibility that the rear wheels may slip sidewardly to cause a so-called swerving phenomenon of the automobile. In this manner, the conventional power transmission apparatus has a problem over a driving performance.

SUMMARY OF THE INVENTION

It is an object of the present invention to provide a power transmission apparatus which can prevent production of rattling noises of a driving system and occurrence of a swerving phenomenon of an automobile in which the power transmission apparatus is employed.

In order to attain the object, according to the present invention, there is provided a power transmission apparatus which comprises a hydraulic transmission coupling mechanism of the vane pump type including a cam ring connected to a first rotary shaft, the hydraulic transmission coupling mechanism further including a rotor connected to a second rotary shaft and accommodated for rotation in the cam ring to define a pump chamber therebetween, the hydraulic transmission coupling mechanism further including a pair of side plates closing the axial opposite ends of the cam ring and each having a through-hole formed therein through which the second rotary shaft extends, the pump chamber containing working fluid therein, the power transmission apparatus being designed to transmit driving force between the first and second rotary shafts in accordance with a pressure of the working fluid in the pump chamber which is produced in response to rotation of the first and second rotary shafts relative to each other, and a frictional force applying mechanism interposed between the first and second rotary shafts for applying predetermined frictional force between the first and second rotary shafts.

The power transmission apparatus thus has a simple construction that the frictional force applying mechanism is interposed between the first and second rotary shafts for applying predetermined frictional force between them. With the simple construction, where the power transmission apparatus is used with an automobile of the full time four wheel drive type wherein required torque should normally be transmitted to the rear wheel side, it is effective to prevent production of rattling noises from a driven system of the automobile. Consequently, noises inside and outside of the automobile are reduced and the driving performance of the automobile is improved.

Further, when the automobile runs on a road on which, for example, sandy places, muddy places and/or snowy or slushy places are locally present, even if the front wheels are alternately and repetitively brought into a slipping condition and a non-slipping condition so that a condition wherein the difference in rotational speed between the front and rear wheels is large and another condition wherein the difference is small or almost zero occur alternately and repetitively, the frictional force applying mechanism assures stabilized transmission of torque to the rear wheels. Accordingly, the power transmission apparatus has an effect that occurrence of a so-called swerving phenomenon of the automobile is prevented.

The above and other objects, features and advantages of the present invention will become apparent from the following description and the appended claims, taken in conjunciton with the accompanyng drawings.

DESCRIPTION OF THE PREFERRED EMBODIMENTS

A power transmission apparatus according to the present invention transmits torque from an input power shaft to an output power shaft by way of a hydraulic pressure which is produced in response to a difference in rotational speed between the input power shaft and the output power shaft. The power transmission apparatus is mounted, for example, at an intermediate portion of a propeller shaft which interconnects front and rear wheels of an automobile. Where the automobile is of the four wheel drive type wherein driving force from an engine carried at a front location of a body of the automobile is transmitted directly to the front wheels and indirectly by way of the propeller shaft to the rear wheels, the input power shaft of the power transmission apparatus corresponds to the front wheel side of the propeller shaft while the output power shaft corresponds to the rear wheel side of the propeller shaft. Accordingly, a difference in rotational speed between the input power shaft and the output power shaft of the power transmission apparatus corresponds to a difference in rotational speed between the front wheels and the rear wheels.

Figure 1:
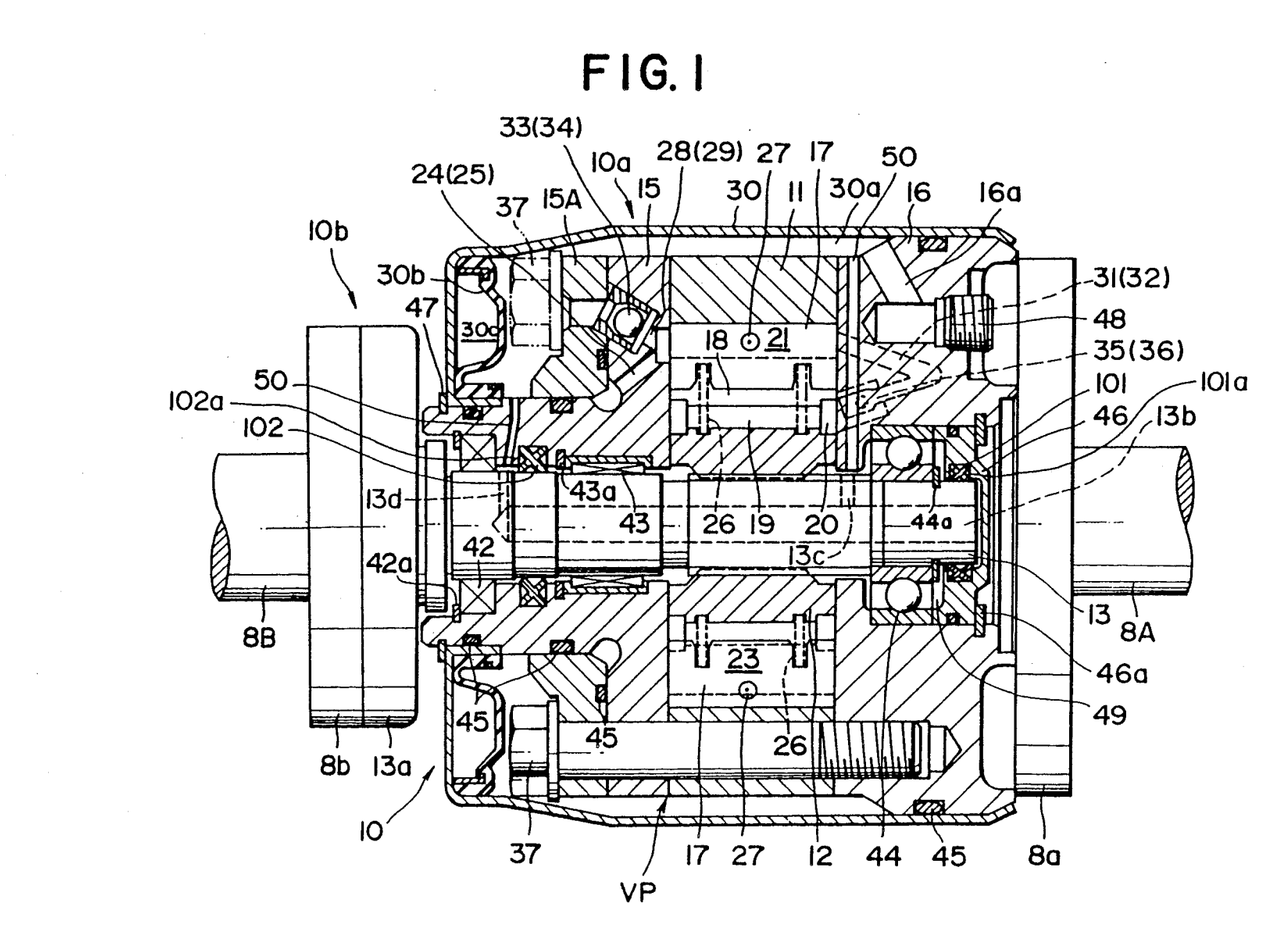
FIG. 1 is a vertical sectional view of a power transmission apparatus taken along line I-I of FIG. 2 showing a first embodiment of the present invention.

Referring first to FIG. 1, there is shown a power transmission apparatus according to a first preferred embodiment of the present invention. The power transmission apparatus generally denoted at 10 is interposed between a first rotary shaft 8A and a second rotary shaft 8B and includes cam ring side section 10a mounted for integral rotation with the first rotary shaft 8A and a rotor side section 10b mounted for integral rotation with the second rotary shaft 8B.

The cam ring side section 10a includes a substantially cylindrical cam ring 11, a pair of end housings or side plates 15 and 16 each having a substantially disk-like configuration and coupled to the opposite ends of the cam ring 11, an annular 15A connected to the end housing 15, and a cover member 30 mounted in such a manner as to cover the cam ring 11, end housings 15 and 16 and spacer 15A.

Each of the end housings 15 and 16 has a throughhole formed at the center thereof, and the second rotary shaft 8B extends through the center holes of the end housing 15 and 16. The end housings 15 and 16, spacer 15A and cam ring 11 are thus disposed in a coaxial relationship with respect to an axis of the second rotary shaft 8B.

The spacer 15A, the end housing 15, the cam ring 11 and the other end housing 16 are coupled in an integral relationship by means of a plurality of bolts 37 screwed in the end housing 16. Among those elements, the end housing 16 is coupled to an end flange 8a of the first rotary shaft 8A so that it may rotate in an integral relationship with the latter.

The cover member 30 is fitter at the opposite ends thereof on the end housings 15 and 16 and secured to the end housing 15 by means of a stopper ring 47. The cover member 30 thus cooperates with the cam ring 11, end housing 15 and 16, spacer 15A and so on in the inside thereof to define a tank 30a in which working oil as working fluid can be accommodated. An air chamber 30c is defined adjacent an end portion of the tank 30a by an annular diaphragm 30b.

A seal member 45 is interposed between each suitable adjacent ones of the elements mentioned above.

An oil path 16a is perforated in the end housing 16 and communicates with the tank 30a such that working oil may be supplied into the tank 30a therethrough. After working oil is supplied into the tank 30a, the oil path 16a is closed by a tapered plug 48.

On the other hand, the rotor side section 10b of the power transmission apparatus 10 includes a rotor 12 and a shaft member 13 serration-coupled to the rotor 12 and serving as an extension of the second rotary shaft 8B.

The shaft member 13 is supported at an intermediate portion thereof for rotation on the end housing 15 by means of a bearing 43 which may be a needle bearing and at an end portion thereof on the first rotary shaft 8A side for rotation on the other end housing 16 by means of bearing 44 which may be a roller bearing. An oil chamber 49 is thus defined by the shaft member 13 and the opposite end housing 15 and 16, and the opposite ends of the oil chamber 49 are sealed up liquid-tight by a seal member 42 and a lid member 46 which has a sealing function.

The other end portion of the shaft member 13 extends outwardly from the end housing 15 and has a flange 13a formed at an end of the outer extension thereof. The flange 13a of the shaft member 13 is coupled for integral rotation to an end flange 8b of the second rotary shaft 8B.

An oil path 13b is formed in the shaft member 13 along an axis of the shaft member 13. The oil path 13b is opened at the end of the shaft member 13 on the first rotary shaft 8A side and communicates with the oil chamber 49. The shaft member 13 has another pair of oil paths 13c and 13d formed therein which communicate with the oil path 13b and are opened to an outer periphery of the shaft member 13.

It is to be noted that the seal member 42, bearings 43 and 44 and lid member 46 are retained in position by means of stoppers 42a, 43a, 44a and 46a, respectively.

Figure 2:
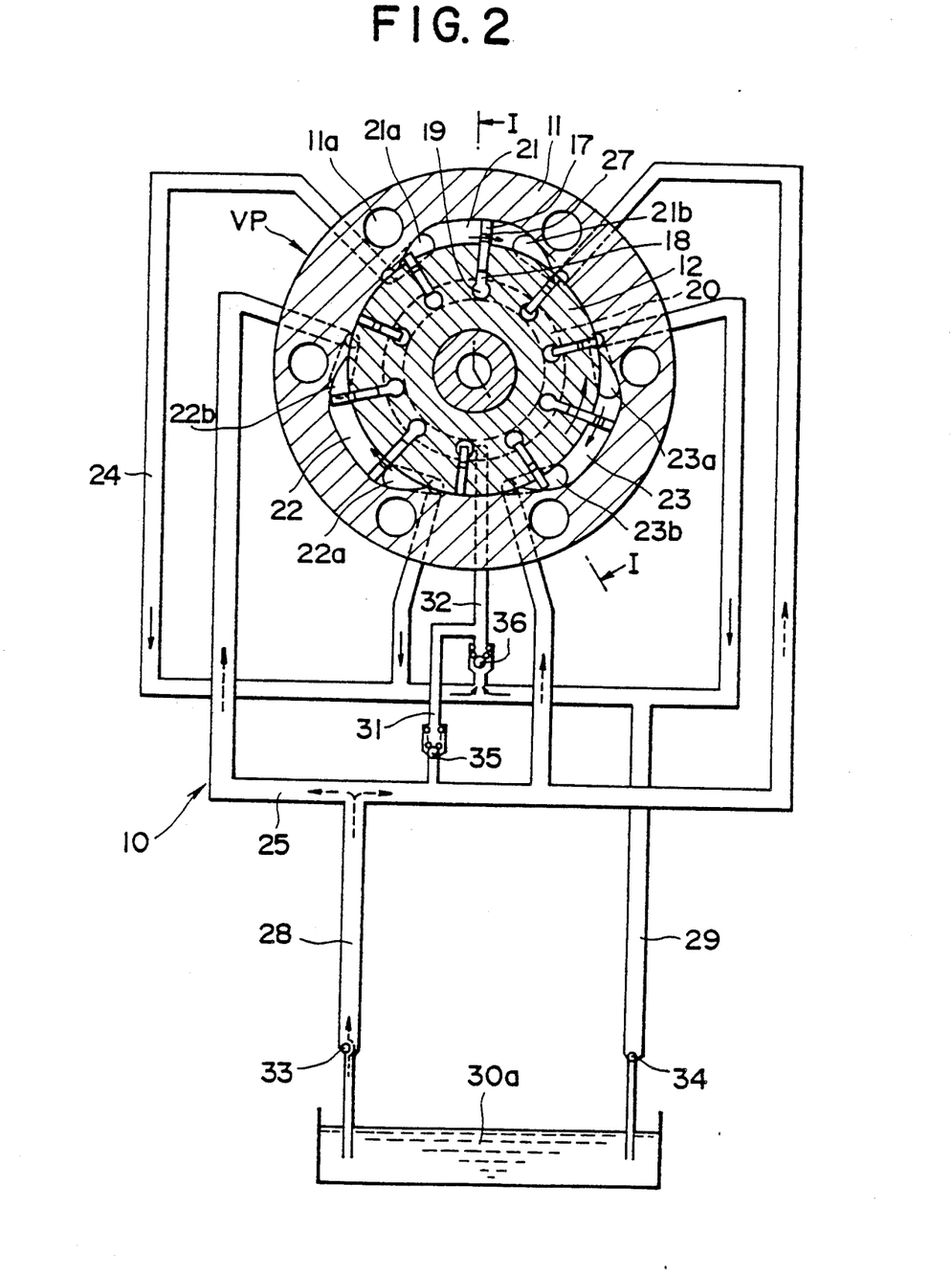
FIG. 2 is a schematic diagram showing passages of working fluid in the power transmission apparatus of FIG. 1.

Referring to FIG. 2, three pump chambers 21, 22 and 23 are formed between the cam ring 11 and an outer periphery of the rotor 12. In particular, a plurality of, three in the embodiment shown, recesses are formed on an inner periphery of the cam rings 11, and the recesses are surrounded by inner walls of the end housing 15 and 16 and the outer peripheral face of the rotor 12 to define the three oil chambers 21, 22 and 23 which have a vertical section of a deformed cresent shape and serve as pump chambers.

Referring to FIGS. 1 and 2, a plurality of vanes 17 are disposed in a circumferentially equidistantly spaced relationship in the rotor 12. The vanes 17 extend radially into the pump chambers 21, 22 and 23 such that each of the pump chambers 21, 22 and 23 may be partitioned into a discharging side chamber and a sucking side chamber by one of the vanes 17.

A vane pump or hydraulic pump VP is thus constituted from the cam ring 11, rotor 12 and end housings 15 and 16 which define the pump chambers 21, 22 and 23 and the vanes 17 in the pump chambers 21, 22 and 23.

The vanes 17 are mounted for back and forth movement in radial directions in radial grooves 18 formed in the rotor 12 and normally biased in the radially outward directions each by means of a pair of springs 26 so that outer ends thereof are held in sliding engagement with the inner peripheral face of the cam ring 11. Each of the vanes 17 has an orifice 27 formed at a radially outer portion thereof for establishing communication between such a discharging side chamber and a sucking side chamber of a pump chamber 21, 22 or 23 as described hereinabove.

An enlarged diameter portion 19 is formed at a base portion of each of the grooves 18 of the rotor 12, and a pair of pressure chambers 20 are formed at the opposite ends of the enlarged diameter portions 19 between the rotor 12 and the end housing 15 for communicating the enlarged diameter portions 19 with each other.

Each of the pump chambers 21, 22 and 23 has a pair of ports 21a and 21b, 22a and 22b, and 23a and 23b formed at the opposite end portions thereof.

The end housing 15 and the spacer 15A have perforated therein a first oil path 24 for establishing communication among the ports 21a, 22a and 23a of the pump chambers 21, 22 and 23, a second oil path 25 for establishing communication among the other ports 21b, 22b and 23b and the pump chambers 21, 22 and 23, and further oil paths 31 and 32 for establishing communication between the first and second oil paths 24 and 25 and the pressure chambers 20. The end housing 15 and the spacer 15A have further oil paths 28 and 29 formed therein for establishing communicaton between the pump chambers 21, 22 and 23 within the cam ring 11 and the tank 30a. The oil paths 28, 29, 31 and 32 have check valves 33, 34, 35 and 36 interposed therein, respectively.

A pair of still further oil paths 50 are perforated in the end housings 15 and 16 and communicate the oil chamber 49 and the tank 30a with each other so that they may have a substantially equal inner pressure.

A pair of frictional force applying mechanisms 101 and 102 are interposed between the cam ring side or first rotary shaft side section 10a and the rotor side or secondary rotary shaft side section 10b of the power transmission apparatus 10 having such a construction as described above.

The frictional force applying mechanisms 101 and 102 may each be an X ring or friction ring having a suitable friction face which is held in sliding contact with an outer periphery of a portion near each end of the shaft member 13. The X rings 101 and 102 are made of a material having a sealing property such as a rubber material and accommodated in annular grooves 101a and 102a formed on inner peripheral walls of throughholes of the end housings 16 and 15, respectively.

It is to be noted that while working oil is supplied into the tank 30a via the oil path 16a and accommodated in an enclosed manner in the tank 30a, the pressuure of the working oil within the tank 30a and the pressure of air within the air chamber 30c are set to a predetermined comparatively low pressure. Thus, if the pressure of the working oil varies during operation of the power transmission apparatus 10, the diaphragm 30b is expanded or contracted by the pressure of the air within the air chamber 30c to suitably adjust the capacity of the tank 30a.

The power transmisson apparatus 10 having such a construction as described above is interposed, for example, between a front wheel side and a rear wheel side in order to attain four wheel drive of an automobile.

Figure 3:
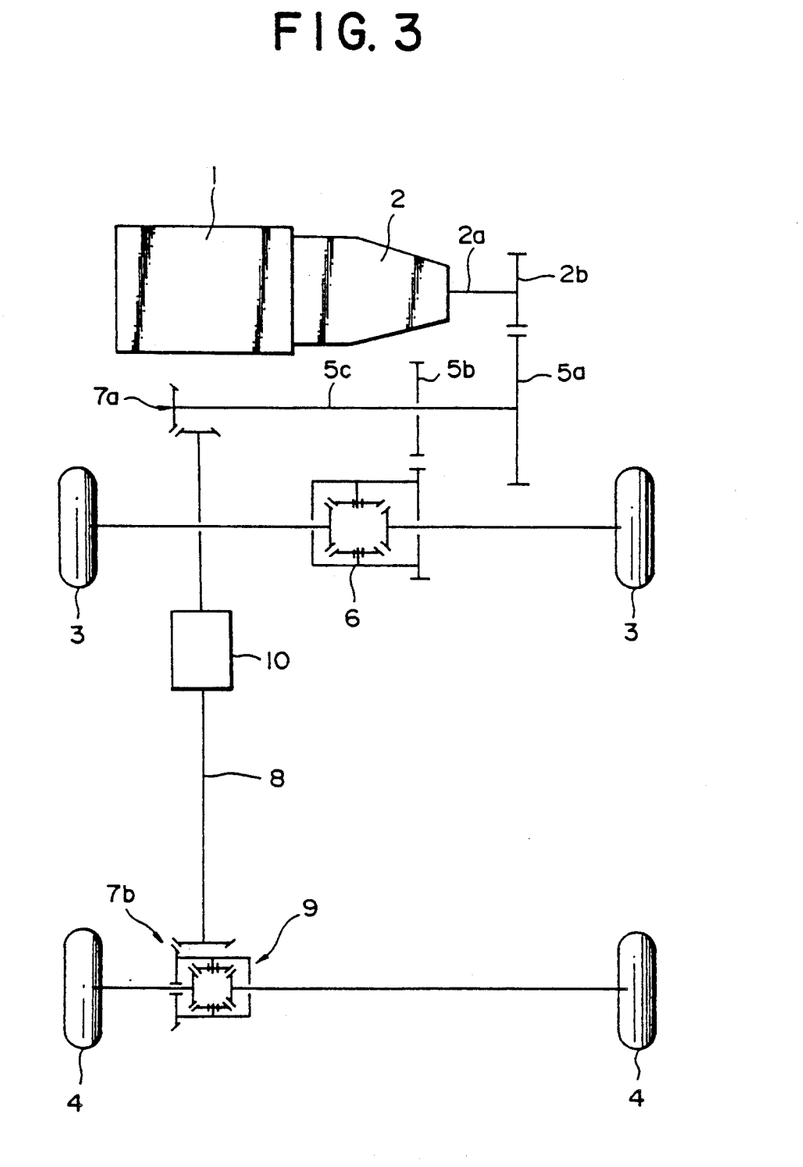
FIG. 3 is a diagrammatic illustration showing a location of an automobile at which the power transmission apparatus of FIG. 1 is mounted.

In particular, referring to FIG. 3, a speed change gear 2 is connected to a transverse engine 1 of an automobile, and a driving gear wheel (or else a four-speed counter gear) 2b is mounted on an output power shaft 2a of the speed change gear 2. A pair of differential gears 6 and 9 are interposed between a pair of front wheels 3 and between a pair of rear wheels 4, respectively. An intermediate shaft 5c is disposed between the engine 1 and the front wheel side differential gear 6, and a propeller shaft 8 is interposed between the intermediate shaft 5c and the rear wheel side differential gear 9.

A first gear wheel 5a and a second gear wheel 5b are mounted on the intermediate shaft 5c, and the first gear wheel 5a is held in meshing engagement with the driving gear wheel 2b while the second gear wheel 5b is held in meshing engagement with a gear formed on an outer periphery of the front wheel side differential gear 6. The intermediate shaft 5c and the propeller shaft 8 are coupled to each other by means of a bevel gear mechanism 7a while the propeller shaft 8 and the rear wheel side differential gear 9 are coupled to each other by means of another bevel gear mechanism 7b.

The power transmission apparatus 10 is interposed at a location near the center of the propeller shaft 8. It is to be noted that, while one of the first and second rotary shafts 8A and 8B of the power transmission apparatus 10 can be set to the driving side and the other can be set to the driven side, here the first rotary shaft 8A is set to the rear wheel side which is the driven side and the second rotary shaft 8B is set to the front wheel side which is the driving side.

The power transmission apparatus 10 is actually at a location particularly nearer to the rear wheels 4 than the front wheels 3. Accordingly, the second rotary shaft 8B has such a suitable length that a torsion may occur within a predetermined range when torque is transmitted by the same.

Since the power transmission apparatus according to the first preferred embodiment of the present invention has such a construction as described above, if any difference in rotational speed occurs between the first rotary shaft 8A on the driven side and the second rotary shaft 8B on the driving side, the rotor 12 will be rotated relative to the cam ring 11, and thereupon, working oil in the pump chambers 21, 22 and 23 is actuated by the associated vanes 17.

Referring back to FIG. 2, if the rotor 12 is rotated, for example, in the counterclockwise direction relative to the cam ring 11, the associated vanes 17 actuate working oil in the pump chambers 21, 22 and 23 such that portions of the pump chambers 21, 22 and 23 adjacent the ports 21a, 22a and 23a forwardly of the vanes 17 act as discharging side chambers while the other portions adjacent the other ports 21b, 22b and 23b rearwardly of the vanes 17 act as sucking side chambers.

Due to a pumping action of the vanes 17, the working oil is discharged into the first oil path 24 through the ports 21a, 22a and 23a now serving as discharging ports and then supplied into the pressure chamber 20 via the oil path 32 as indicated by arrow marks in FIG. 2 to press the vanes 17 with a predetermined force against the cam ring 11.

Simultaneously, in the pump chambers 21, 22 and 23, the working oil flows from the discharging side chambers into the sucking side chambers through the orifices 27 of the vanes 17.

By the way, while the working oil is acted upon by a resistance in accordance with a flow rate when it passes through each of the orifices 27, the flow path resistance acts in such a direction as to prevent rotation of the rotor 12 relative to the cam ring 11.

Accordingly, the rotor 12 and the cam ring 11 are controlled by way of the working oil such that the difference in rotational speed therebetween may be reduced. For example, if the cam ring 11 tends to make a greater rotation than the rotor 12, then part of the rotating torque is transmitted also to the rotor 12 by way of the working oil.

It is to be noted that when the power transmission apparatus 10 is operating, the working oil is used for lubrication of slidably contacting portions of the bearings 43 and 44, rotor 12, vanes 17 and so on.

By such an operation of the power transmission apparatus 10 as described above, torque from the engine 1 is dispersively transmitted at a suitable ratio to the front wheels 3 and the rear wheels 4 so that the front and rear wheels 3 and 4 may normally be rotated substantially at an equal speed in order to attain a four wheel driving condition.

When the automobile is running, for example, in a normal condition and the amount of slip at the front wheels is small, the torque from the engine 1 is mainly transmitted to the front wheels 3 and little transmitted to the rear wheels 4. To the contrary, when the automobile is running on a road of a low friction such as a sandy road and the amount of slip at the front wheels 3 tends to increase, the torque is transmitted dispersively at a suitable rate to the front wheels 3 and the rear wheels 4. Consequently, the slip at the front wheels 3 is actually restricted to a small amount. Accordingly, even on such a low friction road, the wheels will not slip significantly, and the automobile can run with certainly using the four wheels thereof.

Particularly when torque is transmitted by the power transmission apparatus 10, torque (friction torque) originating in frictional force of the frictional force applying mechanisms 101 and 102 is applied in addition to the torque originating in the flowing resistance of the working fluid, and the relationship between the difference in rotational speed and the transmission torque between the first and second rotary shafts 8A and 8B then is indicated by two-dot chain lines in FIG. 4. Accordingly, even within a range wherein the difference in rotational speed is small, the transmission torque is assured at least by a magnitude of the friction torque.

Meanwhile, since the second rotary shaft 8B has such a suitable length that a torsion may occur within a predetermined range when torque is transmitted by the power transmission apparatus 10, even if some variation in rotational speed of the driving system occurs within a range in which the difference in rotational speed is small, such variation in rotational speed will be absorbed by a torsion of the second rotary shaft 8B of the driving system and so on and will be transmitted only a little to the driven system. Consequently, occurrence of collisions of components of the driven system is restricted.

As a result, production of rattling noises of the driven system is prevented, which contributes to reduction in total noises inside and outside of the automobile and also to improvement in the running performance of the automobile. The effect is particularly significant with an automobile of a high output power because generally the greater the torque (total torque of torque outputs of the driving and driven systems), the greater the variation in rotational speed of the driving system.

Meanwhile, when the automobile runs on a road on which low friction places such as sandy places, muddy places and/or snowy or slushy places are locally present, even if the front wheels repeat a slipping condition and a non-slipping condition successively so that a condition wherein the difference in rotational speed between the front and rear wheels is large and another condition wherein the difference is small or almost zero are repeated successively, transmission of torque to the rear wheels is assured stably because additional torque originating in the frictional force of the frictional force applying mechanisms 101 and 102 are applied. Consequently, occurrence of a so-called swerving phenomenon can be prevented.

It is to be noted that if working oil should leak from a sealing portion such as any of the seal members 45 upon operation of the power transmission apparatus 10, working oil is suitably supplemented from the tank 30a.

The temperature of working oil in the inside of the power transmission apparatus 10 such as the tank 30a and the pump chambers 21, 22 and 23 exhibits a wide variation between upon operation and upon stopping of the apparatus 10 and besides is varied by the temperature of the outside air. The temperature of working oil is thus varied in response to a change of the temperature of the outside air such that, when the temperature of the outside air is higher, the working oil tends to be heated to a higher temperature to expand itself and raise the pressure thereof, but when the temperature of the outside air is lower, the working oil tends to be cooled to a lower temperature to contact itself and reduce the pressure thereof.

In such an instance, the diaphragm 30b will operate to absorb a variation of the volume of the working fluid to adjust the pressure of the working fluid within a substantially fixed range.

Consequently, such a trouble that working oil may spout from a sealing portion or the like of the apparatus 10 when the temperature is high or the external air may be admitted into the apparatus from a sealing portion or the like of the apparatus when the temperature is low is eliminated, and the apparatus 10 will operate with certainty.

The power transmission apparatus 10 of the embodiment described above also has an advantage that the cooling efficiency of working oil is high because the tank 30a is provided along the outer periphery of the apparatus 10.

It is to be noted that while the power transmission apparatus 10 of the embodiment described above includes two frictional force applying mechanisms, otherwise it may include only one frictional force applying mechanism.

Figure 5:
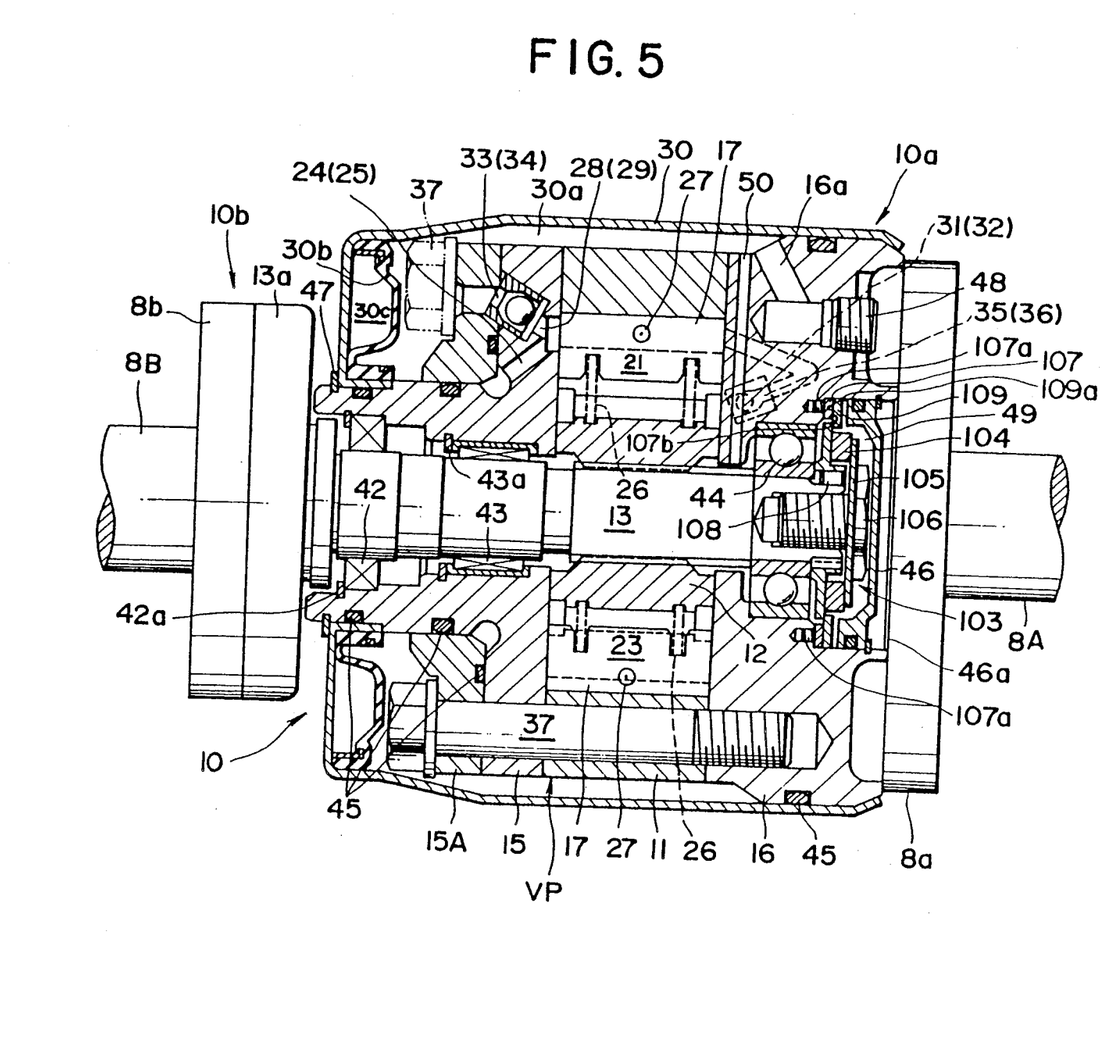
FIG. 5 is a vertical sectional view of a power transmission apparatus showing a second embodiment of the present invention.

Subsequently, a power transmission apparatus of the oil enclosing type according to a second embodiment of the present invention will be described with reference to FIG. 5. It is to be noted that, in FIG. 5, like parts or elements are denoted by like reference symbols to those of FIGS. 1 and 2 (this also applies to modifications to the second embodiment and a third embodiment which will be hereinafter described).

The power transmission apparatus of the present embodiment has a generally similar construction to the power transmission apparatus of the first embodiment and also is generally denoted at 10 but includes a single frictional force applying mechanism 103 in place of the frictional force applying mechanisms 101 and 102 of the preceding embodiment.

The frictional force applying mechanism 103 is disposed between a rotor 12 or a shaft member 13 and an end housing 16. More particularly, the frictional force applying mechanism 103 is disposed at a location nearer to a first rotary shaft 8A than a location at which a bearing 44 is mounted on the shaft member 13 within a greater diameter portion of a through-hole which is formed in the end housing 16 and through which the shaft member 13 extends.

The frictional force applying mechanism 103 includes an annular cam ring side friction plate 107 mounted for integral rotation on the end housing 16 by means of a plurality of detent pins 107a, and an annular rotor side friction plate 109 mounted for axial sliding movement on and integral rotation with the shaft member 13 by means of a key 108. A pair of friction faces 107b and 109a each having a predetermined coefficient of friction are provided at an outer end face of the cam ring side friction plate 109 and an inner end face of an outer circumferential portion of the rotor side friction plate 109, respectively. The friction faces 107b and 109a of the friction plates 107 and 109 are normally held in face-to-face contact with each other.

The frictional force applying mechanism 103 further includes a disk spring or annular spring member 105 and a spring washer 104 which are mounted at an end portion of the shaft member 13 by means of a bolt 106 screwed in the shaft member 13. The disk spring 105 biases the rotor side friction plate 109 toward the cam ring side friction plate 107 via the spring washer 104 in accordance with the position or depth of the bolt 106 screwed in the shaft member 13 so as to enable adjustment of the magnitude of frictional force produced between the friction faces 107b and 109a of the friction plates 107 and 109.

Since the remaining part of the power transmission apparatus 10 is substantially similar in construction to the power transmission apparatus of the preceding embodiment described above, description thereof is omitted herein to avoid redundancy.

Since the power transmission apparatus 10 of the second preferred embodiment has such a construction as described above, if a difference in rotational speed occurs between the first rotary shaft 8A on the driven side and the second rotary shaft 8B on the driving side, substantially similar actions and effects to those of the power transmission apparatus of the preceding embodiment are attained. In this instance, however, the frictional force applying mechanism 103 in the present embodiment operates in the following manner.

In particular, if the first and second rotary shafts 8A and 8B make a rotation relative to each other, the rotor side friction plate 109 is acted upon by suitable frictional force from the cam ring side friction plate 107 due to the biasing force of the disk spring 105 adjusted by the bolt 106. Consequently, upon transmission of torque by the power transmission apparatus 10 of the present embodiment, torque originating in the frictional force by the frictional force applying mechanism 103 is added to torque originating in the flow resistance of working fluid. Accordingly, the difference in rotational speed and the torque transmission between the first and second rotary shafts 8A and 8B present a relationship substantially similar to the relationship between them in the case of the power transmission apparatus 10 of the preceding embodiment (refer to the chain line curves shown in FIG. 4). Accordingly, even within a range in which the difference in rotational speed between the first and second rotary shafts 8A and 8B is small, the torque transmission is higher than a particular level, and accordingly, substantially similar effects to those in the first embodiment described above can be attained.

Figure 6:
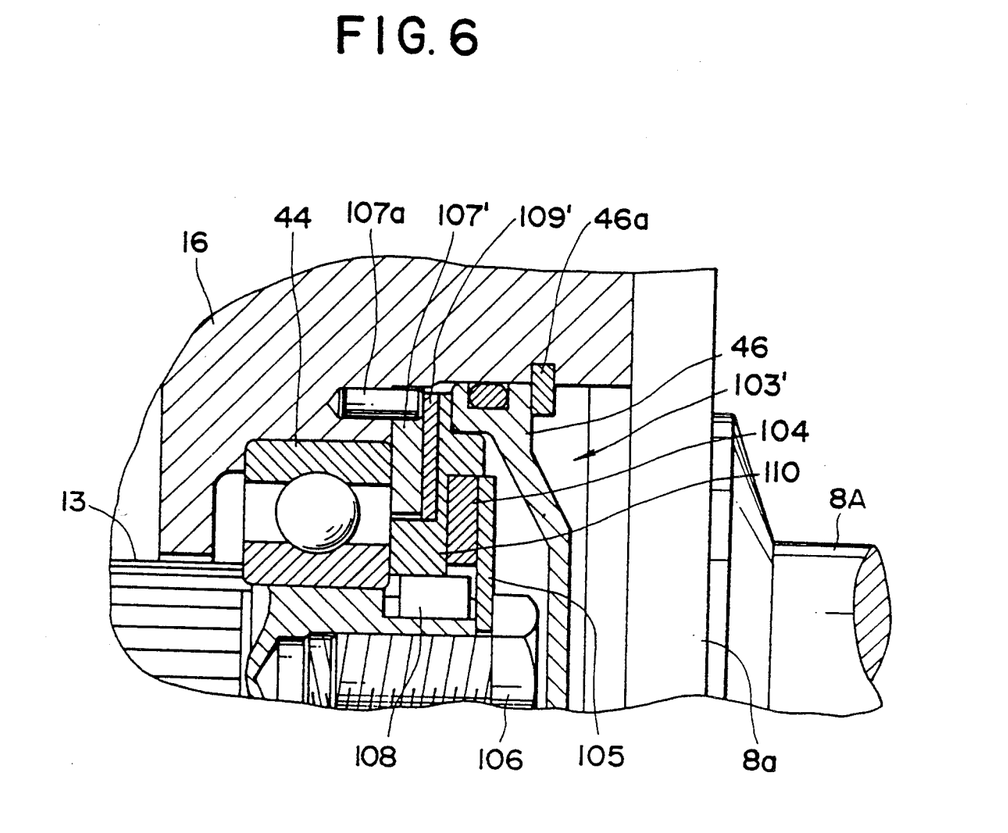
FIG. 6 is a partial enlarged vertical sectional view showing a modification to a frictional force applying mechanism of the power transmission apparatus of FIG. 5.
Figure 7:
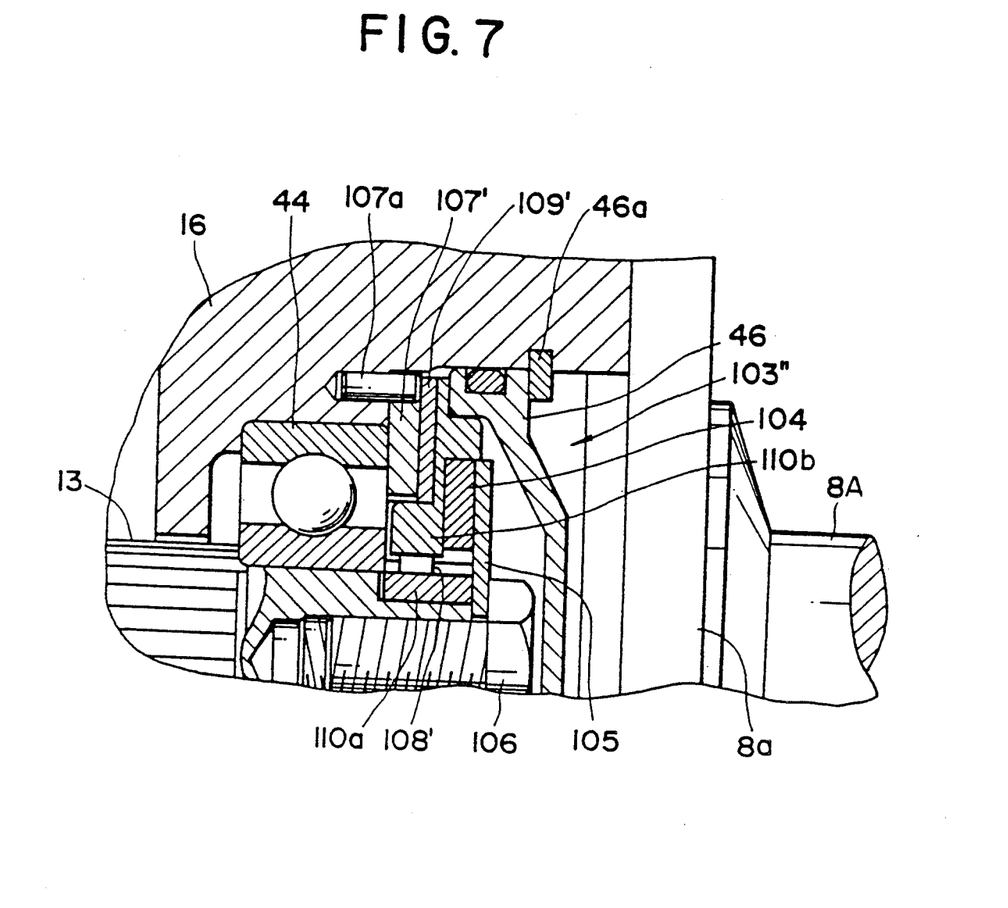
FIG. 7 is a similar view but showing another modification to the frictional force applying mechanism shown in FIG. 5.

It is to be mentioned that the frictional force applying mechanism 103 may be replaced by another frictional force applying mechanism 103' shown in FIG. 6 or by a further frictional force applying mechanism 103'' shown in FIG. 7. In FIGS. 6 and 7, the frictional force applying mechanisms 103' and 103'' are shown in partial enlarged sectional views corresponding to the sectional view of FIG. 5, respectively.

Referring first to FIG. 6, the frictional force applying mechanism 103' shown has a generally similar construction to the frictional force applying mechanism 103 described above but is accommodated at a greater diameter portion of a through-hole of an end housing 16 which is located nearer to a first rotary shaft 8A than a location at which a bearing 44 is mounted on a shaft member 13.

In particular, the through-hole at the center of the end housing 16 includes a greater diameter portion formed adjacent the first rotary shaft 8A and a smaller diameter portion formed in a contiguous relationship to the greater diameter portion remote from the first rotary shaft 8A. The bearing 44 is fitted at the outer race thereof in the smaller diameter portion of the through-hole of the end housing 16 and is held in contact at an inner end face thereof remote from the first rotary shaft 8A with an inner end face of the end housing 16 adjacent the smaller diameter portion of the through-hole. The other end face of the bearing 44 is held in flush with an end face of a step between the greater and smaller diameter portions of the through-hole of the end housing 16.

An annular cam ring side friction plate 107' is mounted in an integral relationship on the end housing 16 by means of a detent pin 107a. The annular cam ring side friction plate 107' has such a great size that it contacts with the end face of the step between the greater and smaller diameter portions of the through-hole of the end housing 16 and also with the outer end face of the outer race of the bearing 44 which face is held in flush with the end face of the step as described above. Accordingly, the outer race of the bearing 44 is held between the end housing 16 and the cam ring side friction plate 107'. The cam ring side friction plate 107' has a greater inner diameter than the outer profile of the inner race of the bearing 44 so that it may not contact with the inner race of the bearing 44.

An annular rotor side friction plate 109' is mounted on an annular friction plate supporting member 110 which is in turn mounted for axially sliding movement on and integral rotation with a shaft member 13 by means of a key 108. The friction plate supporting member 110 has a reduced diameter portion on the inner side thereof remote from the first rotary shaft 8A, and the rotor side friction plate 109' is held in contact with an outer periphery of the reduced diameter portion of the friction plate supporting member 110 and also with an end face of a step adjacent the reduced diameter portion. The reduced diameter portion of the friction plate supporting member 110, however, is spaced from an inner peripheral face of the cam ring side friction plate 107'. The reduced diameter portion of the friction plate supporting member 110 is held in contact at an inner end face thereof remote from the first rotary shaft 8A with the inner race of the bearing 44, and the inner race of the bearing 44 is thus held between the friction plate supporting member 110 and the shaft member 13.

Since the remaining part of the power transmission apparatus is substantially similar in construction to the power transmission apparatus of the second embodiment described above, description thereof is omitted herein to avoid redundancy.

Referring now to FIG. 7, the frictional force applying mechanism 103'' shown is a modification to the frictional force applying mechanism 103' in that the friction plate supporting member 110 of the latter is divided into two members including a bearing holding member 110a for holding the inner race of a bearing 44 therebetween and a friction plate support member 110b on which a rotor side friction plate 109' is mounted.

In particular, the bearing holding member 110a is formed in a cylindrical configuration and fitted around an end portion of a shaft member 13 for integral rotation with the shaft member 13 and only acts to cooperate with the shaft member 13 to hold the inner race of the bearing 44 therebetween. Meanwhile, the friction plate support member 110b is an annular member mounted for axially sliding movement on and integral rotation with the bearing holding member 110a by means of a key 108'. The friction plate support member 110b has a reduced diameter portion on the inner side thereof remote from a first rotary shaft 8A, and the rotor side friction plate 109' is held in contact with an outer periphery of the reduced diameter portion of the friction plate support member 110b and also with an inner end face of a step of the reduced diameter portion remote from the first rotary shaft 8A. The reduced diameter portion of the friction plate support member 110b, however, is spaced from an inner peripheral face of a cam ring side friction plate 107'.

Since the remaining part of the frictional force applying mechanism 103'' is substantially similar in construction to the frictional force applying mechanism 103' described above, description thereof is omitted herein to avoid redundancy.

Also with the frictional force applying mechanisms 103' and 103'', similar actions and effects to those of the frictional force applying mechanism 103 can be attained.

Subsequently, a power transmission apparatus of the oil enclosing type according to a third preferred embodiment of the present invention will be described with reference to FIGS. 8 and 9.

Figure 8:
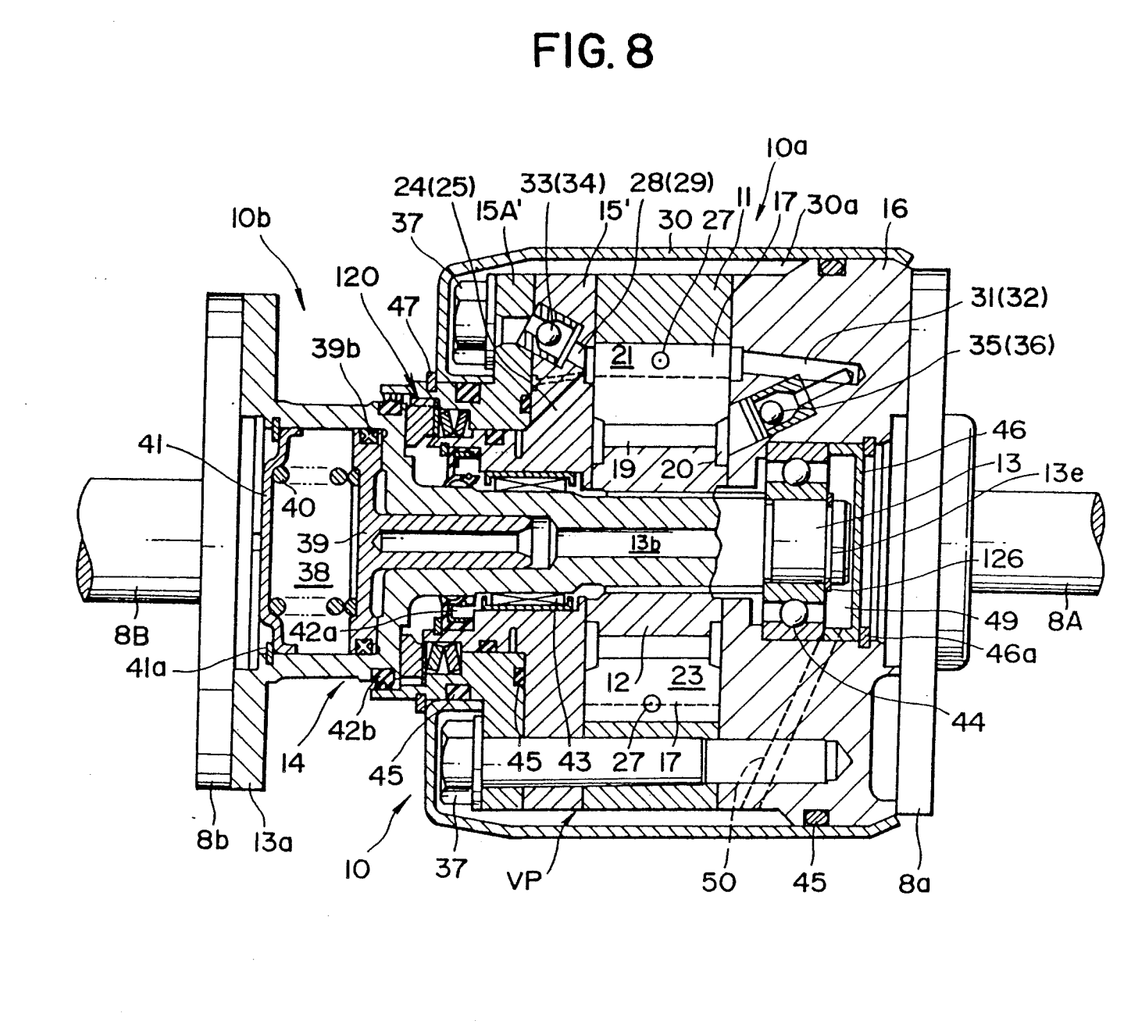
FIG. 8 is a vertical sectional view of a power transmission apparatus showing a third embodiment of the present invention.

In the power transmission apparatus 10 of the present embodiment, a frictional force applying mechanism 120 is interposed between an outer extension or greater diameter portion of a shaft member 13 and a spacer 15A' and an end housing 15' of a cam ring side section 10a as shown in FIG. 8.

Figure 9:
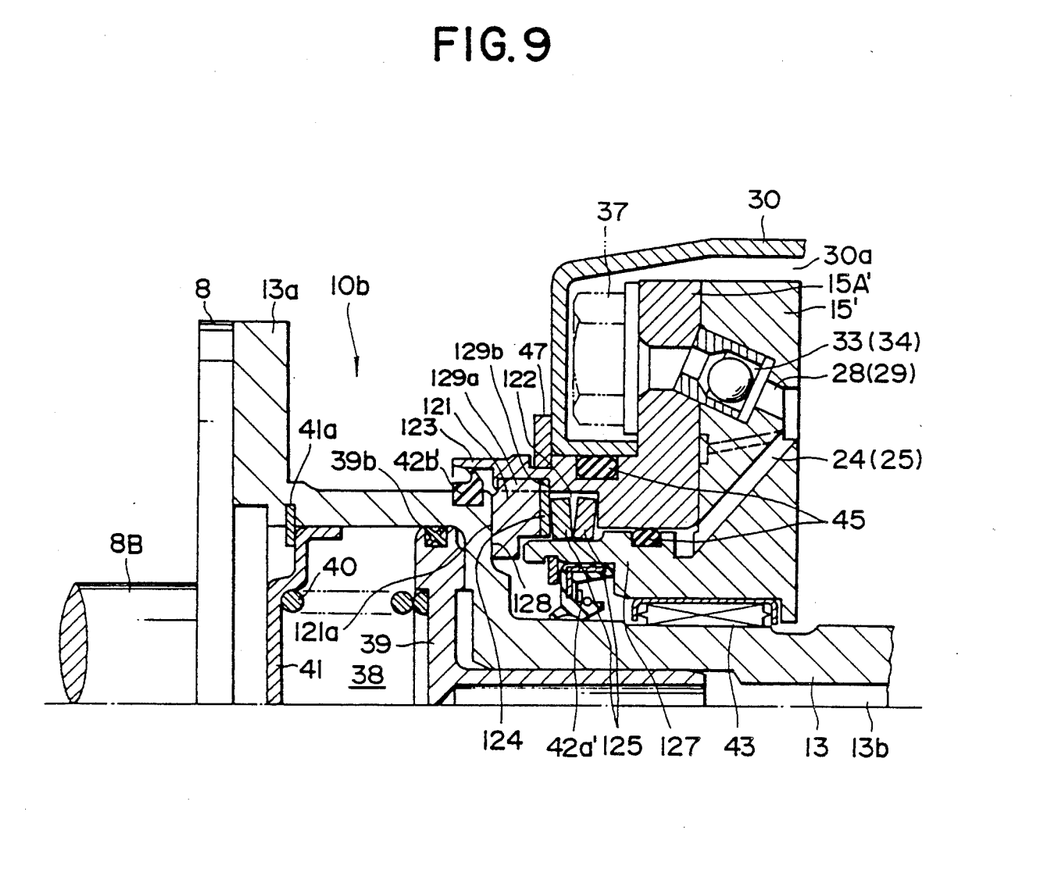
FIG. 9 is a partial enlarged vertical sectional view of the power transmission apparatus of FIG. 8.

In particular, referring to FIG. 9, a cylindrical portion 123 is formed at an axial end of the spacer 15A' adjacent a second rotary shaft 8B and surrounds part of the greater diameter portion of the shaft member 13. Another cylindrical portion 127 is formed at an axial end of the end housing or pressure or side plate 15' adjacent the second rotary shaft 8B and extends between the cylindrical portion 123 of the spacer 15' and the shaft member 13. A spacing 122 is thus defined by and between the cylindrical portions 123 and 127 of the spacer 15A' and the end housing 15'. It is to be noted that the spacer 15A' serves, in the present embodiment, a mounting bracket for the frictional force applying mechanism 120.

Within the spacing 122, a friction shoe or friction plate 121, a washer 124 and a pair of disk springs 125 are disposed in this order from the side of the greater diameter portion of the shaft member 13. The disk springs 125 are normally held in contact with opposing wall faces of the washer 124 and the spacer 15A' to exert resilient force so that the friction shoe 121 may normally be held in contact with an end face 128 of the greater diameter portion of the shaft member 13 which serves as a friction face.

The friction shoe 121 and the washer 124 have keys 129a and 129b formed thereon, respectively, and the keys 129a and 129b are fitted in a key way formed on an inner wall of the cylindrical portion 123 of the spacer 15A' so that the friction shoe 121 and washer 124 may be slidably moved in an axial direction on the cylindrical portion 123 but not rotated in a circumferential direction relative to the cylindrical portion 123.

Referring back to FIG. 8, an annular groove 13e is formed at an end portion of the shaft member 13 remote from the second rotary shaft 8B, and a retaining snap ring 126 is snapped in the annular groove 13e. The retaining ring 126 is contacted by an axial end of the inner race of a bearing 44 remote from the second rotary shaft 8B to define an axial left limit position of the shaft member 13, that is, to restrict leftward axial movement in FIG. 8 of the shaft member 13 so that the shaft member 13 may not be moved axially leftwardly away from a first rotary shaft 8A. At the axial left limit position of the shaft member 13, the friction face 128 of the shaft member 13 is acted upon by predetermined pressing force of the disk springs 125 by way of the friction shoe 121 and the washer 124.

Consequently, frictional force is produced between the friction face 128 of the shaft member 13 and another friction face 121a of the friction shoe 121 which is held in contact with the friction face 128 of the shaft member 13 under the biasing force exerted by the disk springs 125.

It is to be noted that reference symbols 42a' and 42b' in FIGS. 8 and 9 denote each a seal member.

The power transmission apparatus of the present embodiment further includes, as means for absorbing a variation in volume of working fluid, a volume variation absorbing mechanism 14 in place of the diaphragm 30b shown in FIG. 1. The volume variation absorbing mechanism 14 is disposed in the inside of the greater diameter portion of the shaft member 13 and is composed of a volume variation absorbing piston 39 and a compression coil spring 40.

In particular, an oil path 13b is formed in the shaft member 13 and extends along the axis through the whole axial length of the shaft member 13 so that it communicates with an oil chamber 49 adjacent an end of the shaft member 13 on the first rotary shaft 8A side. A piston chamber 38 is formed in the other end portion of the shaft member 13 remote from the oil chamber 49 and has a greater inner diameter than the oil path 13b. The piston 39 is fitted for sliding movement in an axial direction in the piston chamber 38 and normally biased toward the oil path 13b by the compression coil spring 40.

A retainer 41 is secured to the shaft member 13 at an open end of the piston chamber 38 by means of a stopper ring 41a. A recess 39a is formed on an end wall of the piston 13 adjacent the piston chamber 38, and the compression coil spring 40 is received in the piston chamber 38 with one end thereof contacted with the retainer 41 and with the other end thereof contacted with the bottom of the recess 39a of the piston 39. An annular seal member 39b is provided on an outer periphery of the piston 39 for sealing up the piston chamber 38.

Operating oil is pressurized to a predetermined pressure when it is accommodated in an enclosed condition into a tank 30a so that the piston 39 may normally assume a suitable retracted position against the biasing force of the compression coil spring 40. In FIG. 9, the piston 39 is shown at its most advanced position with the pressure of the working oil reduced to its minimum level.

Since the remaining part of the power transmission apparatus 10 is substantially similar in construction to the power transmission apparatus 10 of the preceding second embodiment described above, description thereof is omitted herein to avoid redundancy.

Since the power transmission apparatus 10 of the third embodiment of the present invention has such a construction as described above, if a difference in rotational speed occurs between the first rotary shaft 8A on the driven side and the second rotary shaft 8B on the driving side, the frictional force applying mechanism 120 operates substantially in a similar manner to that of the frictional force applying mechanism 103 of the second embodiment. Accordingly, substantially similar effects are attained.

Particularly with the power transmission apparatus 10 of the present embodiment, since the friction shoe 121 can have a large outer diameter, there is an effect that the face pressure for attaining a predetermined frictional force can be reduced and accordingly the durability of the frictional faces 121a and 128 can be improved. It is further advantageous in that, because the friction shoe 121 can be made with a large size, assembly and disassembly of the apparatus can be made readily, which is convenient for maintenance.

Also with the power transmission apparatus 10 of the present embodiment, when the temperature of the outside air is higher, the working oil tends to be heated to a higher temperature to expand itself and raise the pressure thereof, but when the temperature of the outside air is lower, the working oil tends to be cooled to a lower temperature to contract itself and reduce the pressure thereof as described hereinabove. In order to cope with this, the volume variation absorbing mechanism 14 of the present embodiment operates in the following manner to absorb a variation in volume of the working oil to adjust the pressure of the working oil within a predetermined range of pressure.

In particular, with the volume variation absorbing mechanism 14, if the temperature of the working oil rises so that it tends to expand itself and raise the pressure thereof, then the piston 39 is retracted by the increasing pressure of the working oil to increase the extent of the oil path 13b and increase the capacity of the oil path 13b, thereby permitting expansion of the working oil. On the contrary, if the temperature of the working oil lowers so that it tends to contract itself and reduce the pressure thereof, then the piston 39 is advanced by the compression coil spring 40 to decrease the extent and hence the capacity of the oil path 13b, thereby permitting reduction of the volume of the working oil.

Consequently, such a trouble that working oil may spout from a sealing portion or the like of the apparatus when the temperature is high or the external air may be admitted into the apparatus from a sealing portion or the like of the apparatus when the temperature is low is eliminated, and the apparatus will operate with certainty.

Here, particularly because the volume variation absorbing mechanism 14 is located near the axis of rotation of the rotor 12, reduction in pressure of the working oil near the axis of rotation of the rotor 12 is prevented rapidly while the pressure of the working oil there tends to decrease by rotational motion of the rotor 12 when the apparatus 10 operates. In other words, in such an instance, the piston 39 of the volume variation absorbing mechanism 14 will be advanced rapidly to decrease the capacity of the tank 30a to prevent reduction in pressure of the working oil near the axis of rotation of the rotor 12.

This will eliminate such a trouble that the external air may be admitted into the apparatus from a sealing portion or the like of the apparatus 10 when the apparatus 10 operates, and the apparatus will operate with certainty.

It is to be noted that the power transmission apparatus 10 of any of the embodiments described hereinabove not only can be interposed in a shaft or between two shafts other than the propeller shaft 8 but also can be applied to various apparatus other than such a four wheel drive apparatus for an automobile as described hereinabove.

What is claimed is:

1. A power transmission apparatus suitable for use in a four-wheel drive vehicle having a pair of front wheels and a pair of rear wheels, comprising a first rotary shaft to be connected to one pair of wheels, a second rotary shaft to be connected to the other pair of wheels and a hydraulic transmission coupling mechanism of the vane pump type including a cam ring connected to the first rotary shaft, a rotor connected to the second rotary shaft and accommodated for rotation in said cam ring to define a pump chamber therebetween, a pair of side plates closing the axial opposite ends of said cam ring and each having a through-hole formed therein through which said second rotary shaft extends, said pump chamber containing working fluid therein, said power transmission apparatus being designed to transmit driving force between said first and second rotary shafts in accordance with a pressure of the working fluid in said pump chamber which is produced in response to rotation of said first and second rotary shafts relative to each other, and a frictional force applying mechanism interposed between said first and second rotary shafts for applying predetermined frictional force between said first and second rotary shafts;

wherein said frictional force applying mechanism comprises an annular friction face, an annular friction member, and an annular spring member for biasing said friction member toward said friction face;

wherein said annular friction member is mounted on said second rotary shaft for contacting with said annular friction face formed either on one of said side plates or on a member integral with one of said side plates along a circumferential direction of said second rotary shaft;

wherein said friction member is mounted for axial sliding movement on and integral rotation with said second rotary shaft and said annular spring member is securely mounted on said second rotary shaft; and wherein said friction face is formed on an annular friction plate mounted on an end face adjacent said first rotary shaft of the one side plate adjacent which said first rotary shaft is connected to said hydraulic transmission coupling mechanism, and said annular spring member is securely mounted at an end of said second rotary shaft adjacent said first rotary shaft by means of a bolt.

2. A power transmission apparatus as claimed in claim 1, wherein the through-hole of the one side plate has a greater diameter portion formed near an end portion thereof adjacent said first rotary shaft and a smaller diameter portion formed thereon adjacent said cam ring with respect to said greater diameter portion, and said friction plate, friction member and spring member are accommodated in said greater diameter portion of said through-hole while a bearing for supporting said second rotary shaft thereon is fitted in said smaller diameter portion of said through-hole.

3. A power transmission apparatus as claimed in claim 2, wherein said bearing comprises an inner race and an outer race, wherein an end face of said bearing is held in flush with an end face of a step formed at the boundary between said greater diameter portion and said smaller diameter portion of said through-hole, and wherein said annular friction plate has an inner diameter greater than the outer diameter of the inner race of said bearing and smaller than the inner diameter of the outer race of said bearing and is mounted on said end face of said step.

4. A power transmission apparatus suitable for use in a four-wheel drive vehicle having a pair of front wheels and a pair of rear wheels, comprising a first rotary shaft to be connected to one pair of wheels, a second rotary shaft to be connected to the other pair of wheels and a hydraulic transmission coupling mechanism of the vane pump type including a cam ring connected to the first rotary shaft, a rotor connected to the second rotary shaft and accommodated for rotation in said cam ring to define a pump chamber therebetween, a pair of side plates closing the axial opposite ends of said cam ring and each having a through-hole formed therein through which said second rotary shaft extends, said pump chamber containing working fluid therein, said power transmission apparatus being designed to transmit driving force between said first and second rotary shafts in accordance with a pressure of the working fluid in said pump chamber which is produced in response to rotation of said first and second rotary shafts relative to each other, and a frictional force applying mechanism interposed between said first and second rotary shafts for applying predetermined frictional force between said first and second rotary shafts;

wherein said frictional force applying mechanism comprises a friction face formed on one of said side plates or said second rotary shaft along a plane extending substantially at a right angle relative to an axis of said second rotary shaft, a friction member mounted on the other one of said side plates and said second rotary shaft in contact with the friction face, and an annular spring member biasing said friction member toward said friction face;

wherein said second rotary shaft includes a shaft member having a greater diameter portion formed at an outer extension thereof near one of said side plates adjacent said second rotary shaft, and said frictional force applying mechanism is disposed between the one side plate and end face of a step of said greater diameter portion opposing said one side plate; and wherein said one side plate has a cylindrical portion formed thereon which extends toward said greater diameter portion of said shaft member and partially surrounds said shaft member, and said frictional force applying mechanism includes an annular friction member mounted on an inner periphery of said cylindrical portion of said one side plate for axial sliding movement on an integral rotation with said one side plate, wherein said annular spring member said friction said friction member against said end face of said step of said shaft member.

5. A power transmission apparatus as claimed in claim 4, wherein said cylindrical portion extends from a spacer member mounted on an outer face of said one side plate while said side plate itself has another cylindrical portion formed thereon and extending between said shaft member and said cylindrical portion of said spacer member in such a manner as to define a spacing between the two cylindrical portions, and said friction member and said spring member are accommodated in said spacing.

6. A power transmission apparatus, comprising a hydraulic transmission coupling mechanism of the vane pump type including a cam ring connected to a first rotary shaft, said hydraulic transmission coupling mechanisms further including a rotor connected to a second rotary shaft and accommodated for rotation in said cam ring to define a pump chamber therebetween, said hydraulic transmission coupling mechanism further including a pair of side plates closing the axial opposite ends of said cam ring and each having a through-hole formed therein through which said second rotary shaft extends, said pump chamber containing working fluid therein, said power transmission apparatus being designed to transmit driving force between said first and second rotary shafts in accordance with a pressure of the working fluid in said pump chamber which is produced in response to rotation of said first and second rotary shafts relative to each other, and a frictional force applying mechanism interposed between said first and second rotary shafts for applying a predetermined frictional force between said first and second rotary shafts;

wherein said frictional force applying mechanism includes an annular friction member mounted on said second rotary shaft for contacting with an annular friction face formed either on one of said side plates or on a member integral with one of said side plates or on a member integral with one of said side plates along a circumferential direction of said second rotary shaft;

wherein said friction member is mounted for axial sliding movement on an integral rotation with said second rotary shaft, and an annular spring member is securely mounted on said second rotary shaft for biasing said friction member toward said friction face; and wherein said friction face is formed on an annular friction plate mounted on an end face adjacent said first rotary shaft of the one side plate adjacent which said first rotary shaft is connected to said hydraulic transmission coupling mechanism, and said annular spring member is securely mounted at an end of said second rotary shaft adjacent said first rotary shaft by means of a bolt.

7. A power transmission apparatus as claimed in claim 6, wherein the through-hole of the one side plate has a greater diameter portion formed near an end portion thereof adjacent said first rotary shaft and a smaller diameter portion formed thereon adjacent said cam ring with respect to said greater diameter portion, and said friction plate, friction member and spring member are accommodated in said greater diameter portion of said through-hole while a bearing for supporting said second rotary shaft thereon is fitted in said smaller diameter portion of said through-hole.

8. A power transmission apparatus as claimed in claim 7, wherein said bearing comprises an inner race and an outer race, wherein an end face of said bearing adjacent said first rotary shaft is held in flush with an end face of a step formed at the boundary between said greater diameter portion and said smaller diameter portion of said through-hole, and wherein said annular friction plate has an inner diameter greater than the outer diameter of the inner race of said bearing and smaller than an inner diameter of an outer race of said bearing and is mounted on said end face of said step.

9. A power transmission apparatus, comprising a hydraulic transmission coupling meachanism of the vane pump type including a cam ring connected to a first rotary shaft, said hydraulic transmission coupling mechanisms further including a rotor connected to a second rotary shaft and accommodated for rotation in said cam ring to define a pump chamber therebetween, said hydraulic transmission coupling mechanism further including a pair of side plates closing the axial opposite ends of said cam ring and each having a through-hole formed therein through which said second rotary shaft extends, said pump chamber containing working fluid therein, said power transmission apparatus being designed to transmit driving force between said first and second rotary shafts in accordance with a pressure of the working fluid in said pump chamber which is produced in response to rotation of said first and second rotary shafts relative to each other, and a frictional force applying mechanism interposed between said first and second rotary shafts for applying predetermined frictional force between said first and second rotary shafts;

wherein said frictional force applying mechanism includes an annular friction member mounted on said second rotary shaft for contacting with an annular friction face formed either on one of said side plates or on a member integral with one of said side plates or on a member integral with one of said side plates along a circumferential direction of said second rotary shaft;

wherein said second rotary shaft includes a shaft member having a greater diameter portion formed at an outer extension thereof near one of said side plates adjacent said rotary shaft, and said frictional force applying mechanism is disposed between the one side plate and end face of a step of said greater diameter portion opposing said one side plate; and wherein said one side plate has a cylindrical portion formed thereon which extends towards said greater diameter portion of said shaft member and partially surrounds said shaft member, and said annular friction member is mounted on an inner periphery of said cylindrical portion of said one side plate for axial sliding movement on an integral rotation with said one side plate, and an annular spring member for resiliently pressing said friction member against said end face of said step of said shaft member.

10. A power transmission apparatus as claimed in claim 9, wherein said cylindrical portion extends from a spacer member mounted on an outer face of said one side plate while said side plate itself has another cylindrical portion formed thereon and extending between said shaft member and said cylindrical portion of said spacer member in such a manner as to define a spacing between the two cylindrical portions, and said friction member and said spring member are accommodated in said spacing.

* * * * *